FIG. 3.

INVENTOR.
GUY O. CONNER
BY W.H. Woodlief
ATTORNEY

Feb. 25, 1964 G. O. CONNER 3,121,893
WORK HOLDER WITH MEANS TO ALIGN WORK BLANK WITH TOOL
Original Filed March 12, 1951 8 Sheets-Sheet 4

INVENTOR.
GUY O. CONNER
BY W. H. Woodlief
ATTORNEY

Feb. 25, 1964    G. O. CONNER    3,121,893
WORK HOLDER WITH MEANS TO ALIGN WORK BLANK WITH TOOL
Original Filed March 12, 1951    8 Sheets-Sheet 5

INVENTOR.
GUY O. CONNER
BY W. H. Woodlief
ATTORNEY

Feb. 25, 1964 G. O. CONNER 3,121,893
WORK HOLDER WITH MEANS TO ALIGN WORK BLANK WITH TOOL
Original Filed March 12, 1951 8 Sheets-Sheet 7

INVENTOR.
GUY O. CONNER
BY
W. H. Woodlief
ATTORNEY

INVENTOR.
GUY O. CONNER
BY W. H. Woodlief
ATTORNEY

United States Patent Office 3,121,893
Patented Feb. 25, 1964

3,121,893
WORK HOLDER WITH MEANS TO ALIGN WORK BLANK WITH TOOL
Guy O. Conner, Cleveland, Ohio, assignor to Republic Steel Corporation, Cleveland, Ohio, a corporation of New Jersey
Application Mar. 25, 1958, Ser. No. 723,918, now Patent No. 3,031,700, dated May 1, 1962, which is a division of application Ser. No. 215,131, Mar. 12, 1951, now Patent No. 2,828,492, dated Apr. 1, 1958. Divided and this application Aug. 11, 1961, Ser. No. 130,986
7 Claims. (Cl. 10—139)

This invention relates to work holders for machine tools and to a method for accurately centering workpieces in the work holder. This application for patent is a division of my application for United States Patent, Serial No. 723,918, filed March 25, 1958 for Work Holding Turret for Forming Machines, now Patent No. 3,031,700, which application, in turn, is a division of my application for United States Patent, Serial No. 215,131, filed March 12, 1951, now Patent No. 2,828,492 for Nut Tapping Machine Having Releasable Tap Holding Means to Discharge Tapped Nuts Therefrom.

In said patent and prior application, I have shown an automatic metal working machine having a plurality of horizontal spindles operated from a central shaft. The spindles, in addition to being rotated about the central axis of the machine, revolve to drive a tool and are moved axially by a stationary cam or similar actuating mechanism. The spindles are very accurately and firmly located to avoid misalignment or play. The spindles are arranged around the central axis of the machine in two matching sets, each spindle having an axially aligned, matching spindle facing it from the opposite set. Novel tool holding heads are provided for the spindles. These heads are adapted to hold a tool very firmly yet are able to release the tool so that it may be picked up by the opposite head. Cam operated rods extending through the spindles provide positively operated means for passing the tool from one head to another. The tool is provided with shanks at both ends of the thread cutting part for the heads to grasp in order for the tool to be passed in this manner.

The center of the machine between the two spindles is occupied by a work holding mechanism adapted to receive a workpiece for each pair of spindles. The work holder securely clamps the workpiece in a fixed position determined by a pilot part of the forming tool and is thus accurately located relative to the spindles. The work holder carries the workpiece along in fixed relation to the spindles as the spindles operate on the workpiece and eventually reaches a discharge point where the workpiece is positively discharged from the work holder.

This application is specifically directed to the novel work holder which provides a movable wrench member for receiving the workpiece and which adjustably holds the workpiece until the same has been centered in the work holder by a pilot surface on the tool as the tool is inserted into the workpiece. The invention also involves a method for centering workpieces in tool holders.

A more complete understanding of the method and apparatus involved may be had by reference to the following description and the accompanying drawings which form a part of this application.

The following more specific description will be made with reference to the drawings and will pertain particularly to the machine as set up to thread nuts. It is not my purpose, however, so to limit my invention as it is clear that other work may be performed thereby.

With reference to the drawings, throughout which like reference characters are used to designate like parts, I have used the character 10 to designate the base on which the machine is mounted. A main drive motor (not shown) is mounted at one end of the base and is connected to the machine by a suitable coupling. The supporting structure for the machine includes end standards 16 which comprise not only end supports for the machine but also housings for the gear drives and certain auxiliary equipment as will appear later. Auxiliary supports 18 for the center section are mounted on the base. The supports 18 constitute legs carrying guide members 22 whose formation and function will be described hereinafter. When the machine is in operation, covers (not shown) may be provided.

Figure 1:
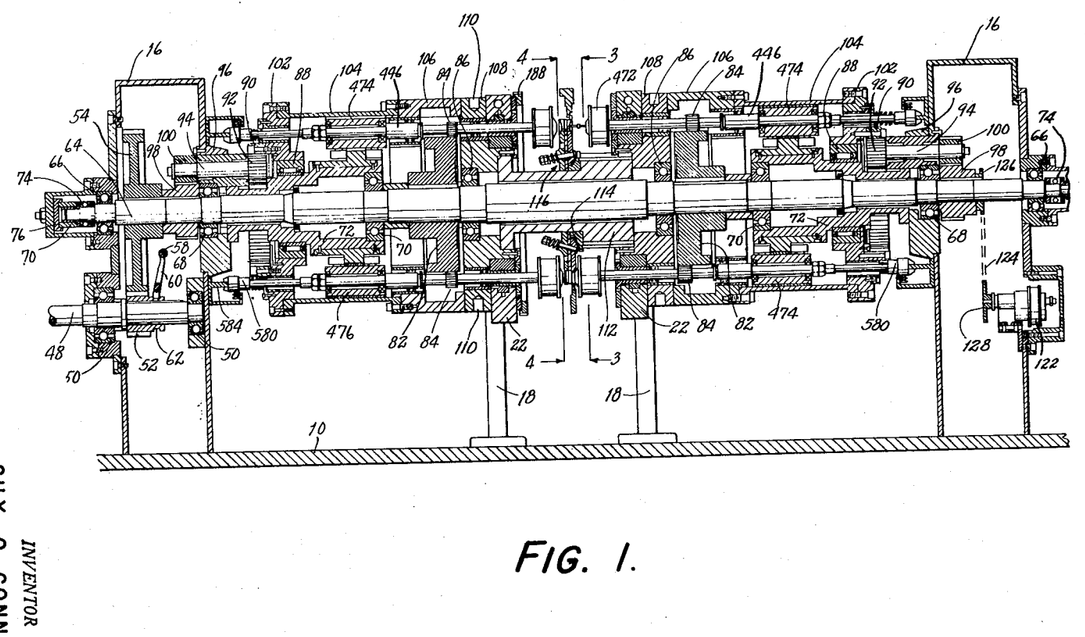
FIG. 1 is a longitudinal medial sectional view through the machine.

The main drive of the machine is from the motor, as noted above, to a shaft 48. As is best shown in FIG. 1, this shaft is journalled, preferably in ball bearings 50, in the left hand standard 16. A pinion 52 is mounted on the shaft 32 and is splined thereto. This pinion is adapted to be shifted into or out of engagement with a gear 54 by an externally accessible lever through a shifting mechanism. This shifting mechanism is a simple fork shifting arrangement actuated by the lever which moves a shaft 58 to which is fixed a shifting fork 60. This fork engages a groove 62 in a collar on the pinion 52 in a manner well known in the art and thus is adapted to shift the pinion into and out of driving engagement with the gear 54.

The drive from the pinion is normally transmitted to the gear 54 and thence to a main drive shaft 64. The shaft 64 is journalled near its end in end bearings 66 in the outer walls of both standards 16 and also in near end bearings 68 in the inner walls. Still further support is provided approximately mid-way between the center of the shaft and at both ends by near center bearings 70 mounted in central stationary members 72. These latter members are bolted or otherwise suitably mounted on the inner walls of the standard 16 at both ends. Thus the shaft is supported by six bearings. Firm support such as this is necessary because the shaft is the sole support of nearly all of the operating mechanism of the machine. Furthermore, such support will help to prevent whipping of the long shaft. A thrust bearing 74 is provided at each end of the shaft. Adjustable cupped members 76 are fixed to the standards 16 and at the right end adjust the compressive force of a spring 78. A spacer 80 is substituted for the spring 78 at the left end of the shaft, but in other respects the devices on both ends are the same.

A pair of large "bull" or sun gears 82 are keyed to the shaft adjacent to and inboard of the near center bearings 77. These gears are the sun gears for two symmetrical planetary gear systems formed by planetary pinions 84 carried about the sun gears 82 by an irregular shaped drum supported partly on the shaft by center bearings 86 and partly on the stationary members 72 by roller bearings 88. This drum is driven from both ends through internal ring gears 90, driven by pinions 92. The pinions 92, in turn, are keyed to similar countershafts 94 journalled in bearing brackets 96 mounted on the inner wall of the standard 16. These countershafts 94 are driven by the main shaft 64 through gears 98 keyed to the main shaft and meshing with gears 100 on the countershafts 94.

The main drum is substantially symmetrical end-for-end, except directly at its center. The ring gears 90 are mounted on end plates 102 which also support the roller bearings 88. The spindle supporting members 106 are fastened to inner wall members 108 on both sides of the center section of the machine. Holes 110 may be provided in the end members 108 into which a bar may be inserted for turning the machine by hand if desired. The wall members 108 hold the center bearings 86 and so help to support the drum. A center hub 112 joins the wall members from both sides and completes the basic structure of the rotating drum. The hub 112 is the only part of the drum assembly which is not symmetrical, being formed with a shoulder 114 to which is fastened a face plate and clamping or work holding mechanism 116, as described hereinafter. A second spindle support member 118 (FIG. 2) may be bolted or otherwise fastened to the wall members 108 on each drum, and a cover plate 120 (FIG. 2) may be used to cover the complete end of the assembly. The cover 120 and spindle support 118 slide freely relative to the guide member 22 and are formed particularly for the purpose of providing proper lubrication and flushing of chips.

A small oil pump 122 (FIG. 1) may be mounted in one of the end supports 16 to provide lubrication for the gears and bearings in that support. The pump is driven by a chain 124 engaged with a sprocket 126 on the main shaft and driving a sprocket 128 on the pump shaft. A sump may be formed in the base of the support to catch the oil and supply it to the intake side of the pump 112.

As the nut blanks leave the feed control device, which is shown in my pending application for United States patent, Serial No. 723,891, filed March 25, 1958, for Blank Feeding Device for Metal Working Machines, now Patent No. 3,035,684, they pass through a chute 34 (FIG. 7) into an injector device which positively injects one nut blank into each receptacle of the work holding turret 116 as the turret passes. This injector device is mounted on an arcuate support 130 (FIG. 8) which also supports a device to carry away completed nuts and various other auxiliary equipment at the center part of the machine. As previously stated, the center supports 18, which are disposed in spaced longitudinal relation at the center of the machine, carry generally rectangular plates forming the guide member 22, as can best be seen in FIG. 1. These plates are also disposed in longitudinally spaced parallel relation. The upper edges of the members 22 have secured thereto in bridging relation a bar 132, which can be seen in FIG. 7. The support 130 is carried on the frame at its upper and lower portions.

The nut blanks are guided by the chute 34 to an inlet guide 140 which has a cover 142. The guide rotates the nut blank and sets it up on edge, as more fully shown in my Patent 3,031,700. An observation slot 144 may be left between the cover 142 and the inlet guide 140 if desired to watch the progress of the blanks. From this guide, the nut blank enters a movable entry member 146. This member is formed with a slot for the nuts which is also covered by the cover 142. The cover 142 is pivoted to a supporting frame 150 of the injector by a screw 152. A spring 154 engaged between the cover 142 and the framework 150 biases the member 146 to the position shown. A lip 156 guides the blanks to their proper position over a slot 158. A ram 160 movable vertically (FIG. 7) normally retracts, receives the nut, and forces it downward in the slot 158 formed in the injector. In case the blank is misaligned as it enters the injector, the member 146 pivots against the force of the spring 154 and prevents damage to the machine or to the blank. On the next successive stroke, the nut will almost invariably find its way into the slot 158 and pass through the machine. The motion of the member 146 may be utilized to operate a shut down switch (not shown) by forming a vane 164 on the member and mounting the switch in position to be operated thereby. This has been discovered to be an unnecessary precaution, but might be useful in some cases.

Figures 7, 7A, 8:
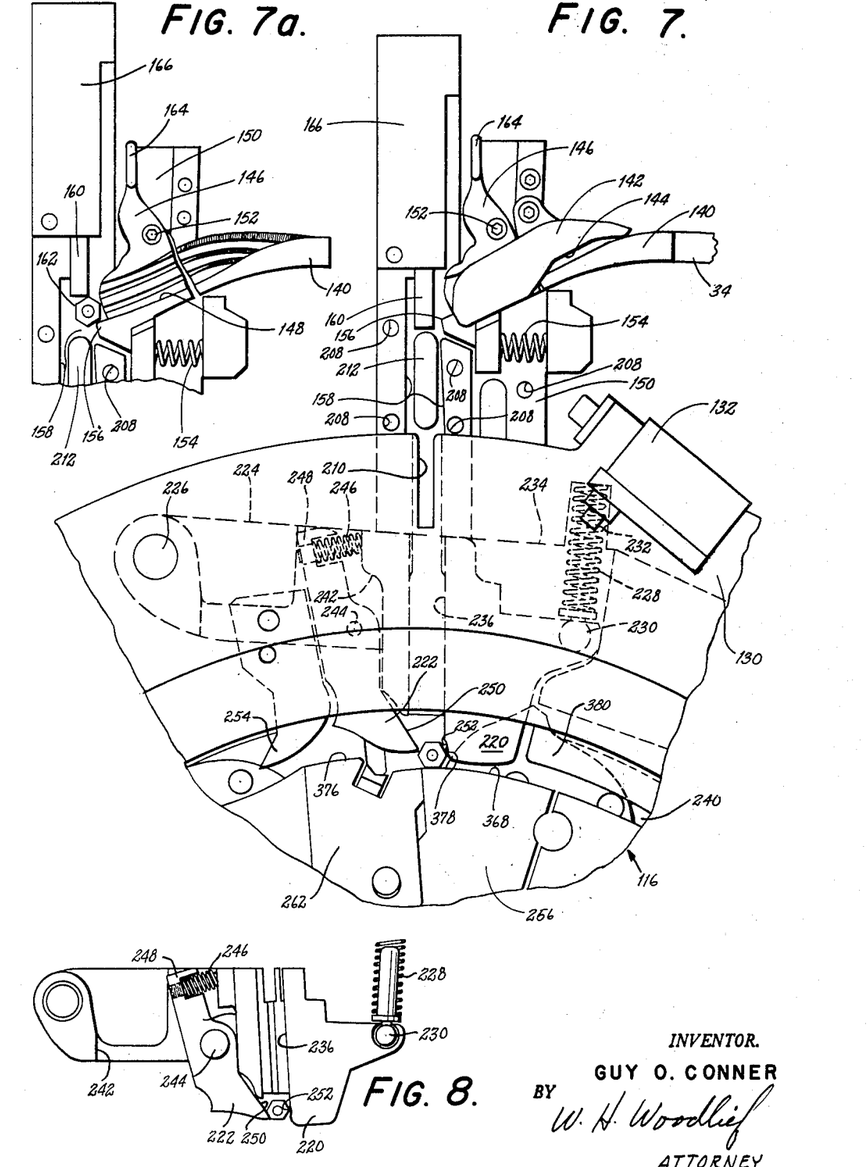
FIG. 7 is a detailed elevational view of the injector mechanism from the same side as FIG. 3 and rotated approximately 45 degrees to an upright position, some of the parts having been removed to show underlying parts.
FIG. 7a is a detail of FIG. 7, a cover element being removed to show underlying structure.
FIG. 8 is an elevational view of a feeder piece forming part of the injector mechanism of FIG. 7, removed from its surroundings and drawn to a reduced scale.

Between injection strokes, the blank at the bottom of the slot 158 is held between two fingers 220 and 222 (FIG. 8). The finger 220 is formed as a part of a movable piece 224 pivoted to the support 130 at 226 (FIG. 7). The piece 224 is biased toward the center of the machine by a spring 228 having an end fitting 230 at one end seated in a socket in the piece 224, and the other end seated in a hole 232 formed in a flange 234 of the support member 130. A continuation 236 of the slot 158 is formed in this piece and is closed by the support 130, so that the channel for the nuts is substantially continuous. Motion of a blank along its axis as it passes out of the slot 236 toward the end of the fingers 220 and 222 is prevented by a spider plate 238 and a face plate 240 disposed on opposite sides of the fingers 220 and 222. These plates are a part of the face plate and clamping or work carrying mechanism 116.

The second finger 222 is movably disposed in a hollow 242 in the piece 224 and pivots about the pin 244 (FIG. 8). A compression spring 246 engages a wall of the hollow 242 and the outer end 248 of the finger 222 and thus biases the end of the finger 222 toward the opposite finger 220. At its lower end, the finger 222 is formed with a flat surface 250 slanting at an angle of approximately 60 degrees so as to engage the flat surface of the nut blanks as they come down the channel. In FIG. 7 the blank has been pushed beyond the end of the finger 222 and the face 250 is ready to engage the next succeeding blanks when the lower blank is eventually removed from the mechanism 116, as hereinafter described. Between injection strokes, the lowest nut blank is held between the fingers 220 and 222, as shown in FIG. 8. A slight dimple 252 may preferably be formed in the finger 220 to hold the nuts in place until action of the ram 160 forces them out of the channel. It will also be noted that the hollow or relieved part 242 extends beyond the finger 222 toward the pivot point to provide clearance for a hook 254 whose purpose will be made clear hereinafter.

Figures 9, 10, 11:
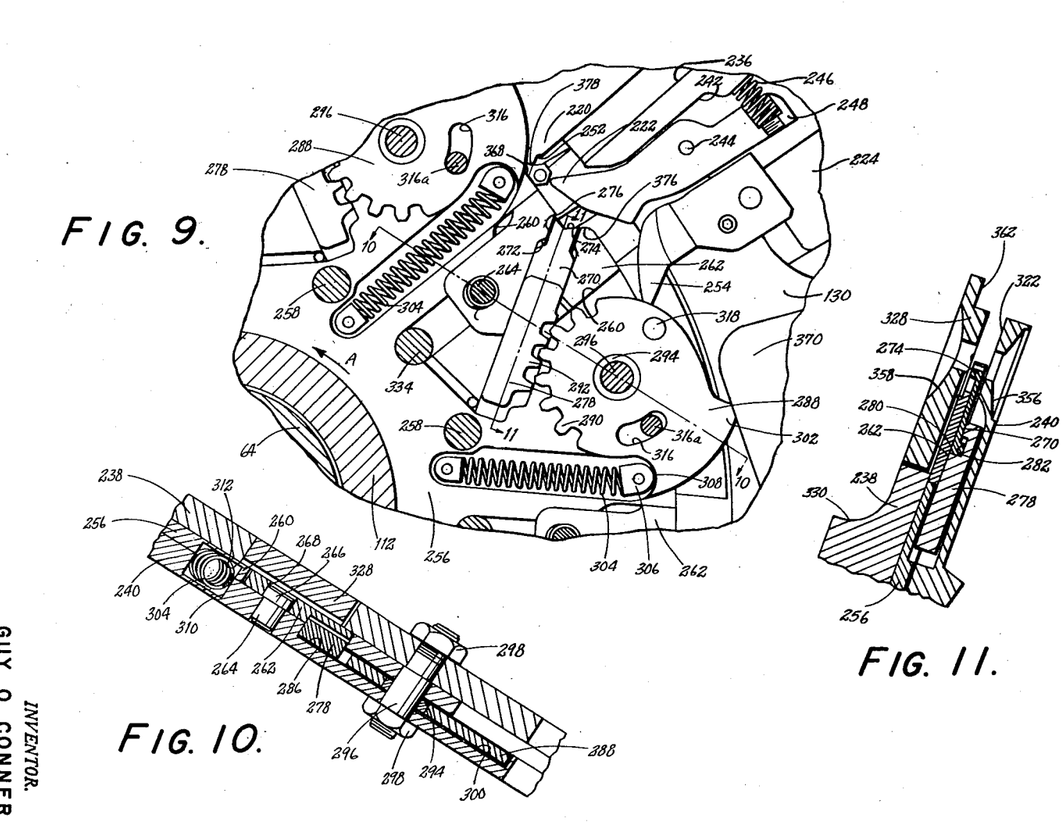
FIG. 9 is an enlarged detailed view of a portion of FIG. 4.
FIG. 10 is a sectional view along line 10—10 of FIG. 9.
FIG. 11 is a sectional view along the line 11—11 of FIG. 9.
Figure 12:
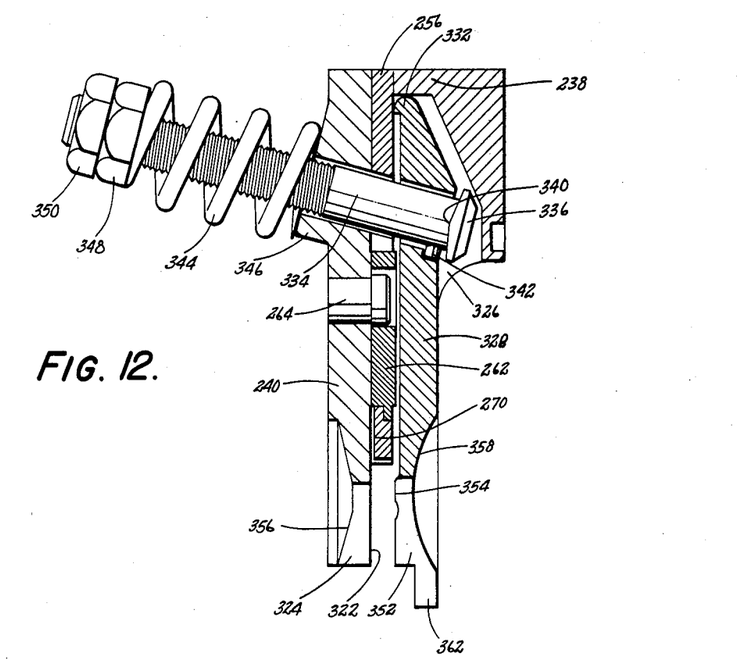
FIG. 12 is a radial sectional view through the center line of the clamp mechanism.

The work carrying mechanism 116 as noted above is carried by the central hub member 112 and therefore rotates in unison with the spindle carrying drum. The primary structure of the mechanism 116 is formed of three plates: the spider plate 238, the face plate 240, and, between these two plates a carrier plate 256 (FIG. 11). Reference may be had to FIG. 12 which shows an enlarged section of this mechanism. These plates are each made in two segments so that they can be assembled on the hub member 112 and are fastened to the hub by cap screws 258 (FIG. 4). The plates thus are rotated in the direction of the arrow A (FIGS. 3, 4 and 9), by the hub member.

Most of the working mechanism of the work holder is carried between the face plate 240 and the spider 238. This mechanism is designed not only to prevent the nut from rotating while it is being threaded, but also to assure perfect alignment of the nut with the threading tool, both as to the hole in the blank and as to the center line of the threads being normal to the face of the nut. The mechanism also provides positive means of ejection of the nut from the clamp and provisions to prevent jamming of the nuts at the high speeds at which the machine can be operated.

Figure 3:
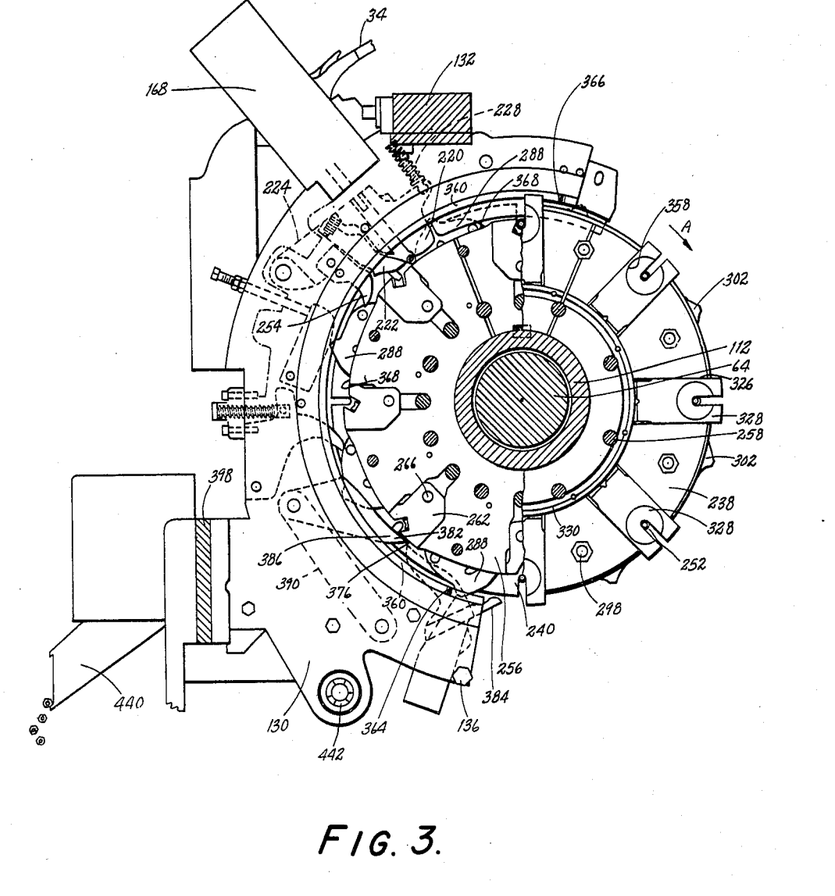
FIG. 3 is an enlarged sectional view taken along line 3—3 of FIG. 1.
Figure 4:
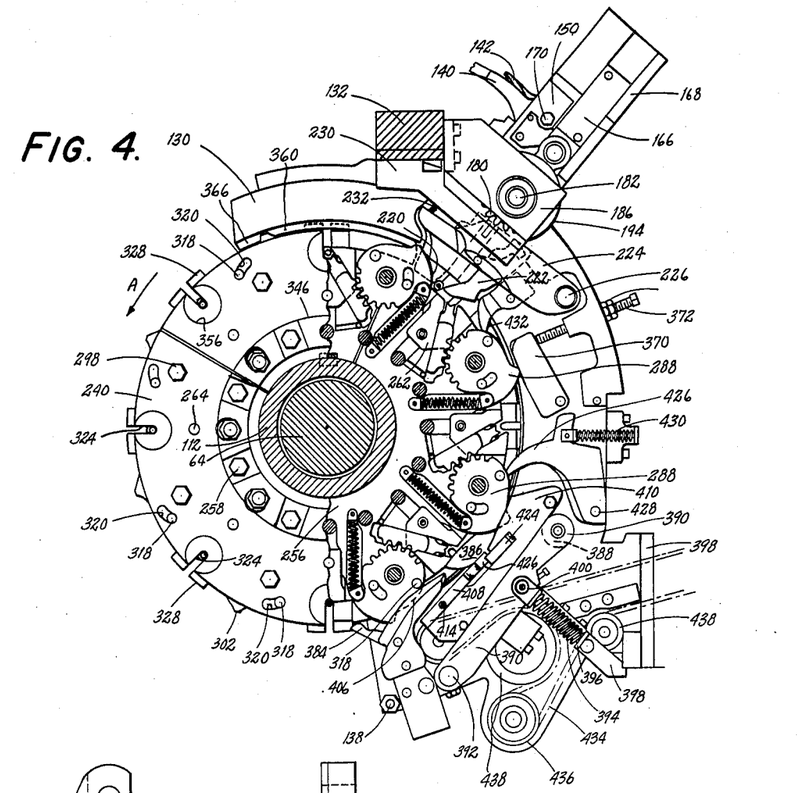
FIG. 4 is an enlarged sectional view taken along line 4—4 of FIG. 1.

The carrier plate 256 is formed to provide openings 260 in which are disposed the wrench members 262 (FIGS. 3 and 9). A pin 264 pressed into the face plate 262 (FIG. 10) has a head 266 extending into a slotted opening 268 in the wrench. Thus the wrench is free to move slightly in a radial direction. A pusher bar 270 is slidably disposed in a relief 272 in the wrench 262, and has an end 274 formed the full thickness of the wrench member adapted to move in a slot 276 in the wrench. This end 274 is formed to receive two adjacent sides of the nut so that the wrench actually will engage four sides of a hexagonal nut, for example.

The pusher 270 is adapted to be moved by a rack 278. This movement is transmitted by the engagement of a flange 280 on the pusher 270 in a slot 282 formed in the rack member (FIG. 11). The slot 282 is somewhat loose on the flange 280 to allow the pusher 270 to follow the wrench 262 in its slight radial movement previously mentioned, while the rack retains its position. The rack member itself is slidably disposed in a channel formed by matching reliefs 284 and 286 in the carrier plate 256 and face plate 240, respectively (FIGS. 9 and 10). Movement of the rack is induced by a gear member 288 having teeth 290 partially around its periphery and meshed with the teeth 292 on the rack. This gear 288 is journalled on a brass bushing 294 surrounding a bolt 296 extending through the three plates and having a nut 298 on each end. The gear is disposed wholly within a relief 300 in the face plate 240 which is covered by the surface of the carrier plate. Thus the gear 288 is displaced slightly from the plane in which the pusher 270 operates, and in which the nut blanks are inserted into the wrench. The gear member 288 is moved by engagement of a follower portion 302 formed on its periphery with either of various cam members fixed to the support 130 and which will be described later. This movement is resisted by a spring 304 fitted with end members 306 engaging the face plate 240 and carrier plate 256 at one end and an ear 308 on the gear member at the other end. The spring is disposed in a channel formed by relief grooves 310 and 312 in the face plate and carrier plate, respectively. A pin 316a pressed into the face plate 240 and extending through an arcuate slot 316 in the gear member 288 forms a stop member to limit the motion of the gear. A second pin 318 extends upward from the gear member through a slot 320 in the face plate (FIG. 4) and beyond to provide follower means for a camming action to help the spring return the gear to its normal position as will later appear.

As noted above, the nut as it comes from the injector channel slides between the inner surfaces of the face plate 240 and spider 238. A surface 322 (FIG. 12) of the face plate is a smooth flat and continuous surface broken only by radial slots 324 just wide enough to clear the threading tool as it passes through the nut. The surface 322 is accurately formed so that when the work carrying assembly 116 is fixed to the drum member 112, the surface is normal to the center line of the machine within very small tolerances. This insures that one face of the nut will be normal to the center line of the tapping tool.

The spider plate 238 is formed with openings 326 (FIG. 3) substantially radially of the plate in which are disposed clamp members 328. A hub 330 is formed at the center of the spider and the opening 326 is cut into but not through this hub (FIG. 12). The clamp member 328 extends into the opening in the hub and at the inner end is formed with a fulcrum 332 adapted to press against the carrier plate 256. The clamp is pulled toward the face and face plates 240 and the carrier plate 256 by a bolt 334 extending through the clamp, carrier and face plate. This bolt has a special head 336 adapted to ease the rocking action of the clamp. The surface of the head engaging the clamp is formed with a V-shape so that only the apex 340 of the V engages the clamp. A small pin 342 carried by the bolt 334 and engaged in a slot in the clamp 328 prevents the bolt from becoming misaligned and therefore insures that the apex 340 is always in the proper line for the clamp to rock thereon. A spring 344 engaged between a hub 346 on the face of the plate and a nut 348 on the bolt 334 holds the clamp normally closed. A jam nut 350 may be used to prevent movement of the nut 348. The spring is preferably quite heavy and is prestressed to assure that the clamp will be held in its closed position at all times except when forcibly opened. A slot 352, similar to the slot 324, is formed in the free end of the clamp. However, instead of a smooth flat surface as on the face plate, it is preferred that a slight transverse ridge 354 be formed on the inner surface of the clamp by cutting a groove into the base of the clamp. This ridge engages the nut blank approximately at a center line and assures that the blank will be lined up by the face plate which is a fixed surface instead of the clamp which moves and might be out of line because of the differences in the thickness of the blanks. The face plate 240 and clamp 328 both have hollows 356 and 358 respectively at the edge opposite the slots to provide clearance for the spindle heads later to be described.

In order to inject or eject a nut from the clamp, it is necessary that it be opened by external means. This may conveniently take the form of a cam ring 360 (FIG. 3) formed on the support 130. This ring extends along the inner side of a lip 362 on the clamp member 328 and is formed with a rise at 364 at its lower end (FIG. 3) which serves to spread the clamp member away from the face plate. The cam ring 360 is in reality only a continuation of the support 130 and is formed with varying thickness to operate the clamp. The rise 364 is located so that the nut may be ejected at the proper time, and the clamp 328 is held open by the ring 360 until it reaches a fall at 366 somewhat beyond the point where the nut is injected, for a reason to be made clear hereinafter.

During a cycle of rotation of the clamp and wrench mechanism a series of events takes place. As noted above, rotation of the plates is in the direction of the arrow A. As the nut is injected, it is pressed onto the outer edge surface 368 of the carrier plate (FIG. 9). It is held there in spring pressed engagement by the spring 172 on the ram of the injector through the train of nuts in the channel 158. As the plates move around, beneath the nut, an adjustable cam 370 (FIGS. 4 and 9) engages the follower part 302 of the gear member 288 and rotates the gear, pushing the pusher bar 270 up to a position where one surface of the end 274 is substantially in line with the outer edge 368 of the carrier plate and the corresponding surface of the wrench 262, as seen in FIG. 9. The cam 370 may be adjusted by a screw 372 which is locked by a jam nut 374, so that this alignment can be established and maintained. The nut then slides smoothly into the end of the pusher, while the finger 222 of the injector just clears an upper edge surface 376 of the wrench (FIGS. 7 and 9).

As soon as the blank is in the end of the pusher, the follower 302 is disengaged from the cam 370, and the spring 304 reverses the motion of the gear 288, thus retracting the pusher. The nut may then fall into the wrench. However, this is not a positive movement as may be necessary, and, therefore, the finger 220 is long enough to engage the nut and push it into the wrench. A rounded corner 378 on the finger aids this operation. A downwardly extending rib 380 on the support 130 and having an inner surface concentric with the carrier plate 256 extends close to the wrench 262 and opposes the tendency of the nut blanks to come out of the wrench because of the centrifugal force of the blank. As noted above, the finger 220 is a part of the movable piece 224 and is, therefore, adapted to slide upward on the side of the nut blank should it not recede quickly enough. However, the finger is purposely made broad in the direction of travel of the plates so that should the finger ride up in such manner, the pressure of the spring 228 on the piece 224 added to that of spring 304 on the gear will surely cause full retraction. As the finger 220 passes over the nut, the corner 378 strikes a rounded corner 382 formed on the wrench which cams the finger up over the surface 376. This impact is quite hard, and it is considered possible and perhaps even desirable, although not necessary, that a crank device operated from the ring gear 188 similar to the nut injector could be used to raise the finger 220 in timed relation to the passage of the wrench to avoid the impact.

As the nut is carried beyond the finger 220, it is fully retracted into the wrench. It will be recognized that the pusher mechanism may not be essential, and that a nut would be inserted into the wrench without such mechanism. In this case, the wrench could be formed with an opening similar to the shape of the present wrench with the pusher retracted. However, it has been found that there is considerable tendency for a nut blank pressed onto the surface 368 to roll into the wrench rather than to slide. When such rolling occurs, a few of the blanks are caught by the wrench across their corners instead of across thin flat faces. This jams the machine and, in view of the speed at which the machine may be operated, such jamming might very well result in breakage of parts. The movement of a flat surface in line with the edge 378 strongly deters such rolling so that all the nuts may be retracted properly into the wrench.

The clamp 328 is held open during the entire injection process as described, by the cam ring 360. It is held open even beyond the full retraction of the nut. During this next succeeding period, the threading tool is inserted through the slots 352 and 324 in the clamp and face plate respectively and through the central hole in the nut blank. The mechanism to accomplish this will be described hereinafter as will the formation of the tool which causes the insertion to line up the hole. Suffice it to say that, by the insertion of the tool into the hole in the blank, the nut, along with the wrench which is free for limited radial movement as noted above, may be moved slightly. As soon as the nut is aligned, however, the clamp 328 is allowed to close because of the fall 366 of the cam, and the blank is then clamped securely against the face plate 240 and held from rotation by the wrench 262. Just beyond this point the work holder member 116 carries the blank beyond the end of the rib 380.

During the next period of motion of approximately 180 degrees of the plates, the threading tool is driven through the blank by mechanism hereinafter described. However, as the blank reaches the bottom of the machine (FIGS. 3 and 4), the clamp 328 again engages the rise 364 (FIG. 3) of the cam 360 and is opened. At this point, the nut is free to fall out or be thrown out of the wrench by centrifugal force onto a discharge mechanism which removes the completed nuts. However, in order to get a positive discharge, a second cam 384 is mounted on the support 130 to move the pusher bar 270 outward from the center of the plates and force the nut out of the wrench. Since the exact final location of the pusher is not of great importance here, no adjustment is provided. In order to assure that no nuts are carried beyond this station, a stripper 386 in the plane of the wrench extends almost to the outer surface 376 thereof to strip off any nuts and also any metal chips which may be carried along in the process. The stripper 386 is mounted on a spacer 388 at one end of a long arm 390 pivotally mounted to the support member 130 at 392 (FIG. 4). A spring 394 engaged between a boss 396 mounted on a plate 398 and a fitting 400 on the arm 390 urges the stripper to an inward position towards the center of the plates. Inward motion of the arm 390 may be prevented, however, by engagement of the spacer 388 with a plate 410 fixed to the support 130 but spaced therefrom by a boss 404 so that the stripper may extend between the plate 410 and the support 130. It will be apparent that other stop means might be used to hold this stripper and arm and prevent their movement beyond certain limits. A rounded corner on the stripper allows it to ride up on the corner 382 of the wrench and effectively clear the edge surface 376.

As the wrench 262 passes the stripper 386, the cam 384 releases the follower 302 and the pusher is free to recede. However, at this station, there may be chips or the like interfering with free movement of the pusher and, therefore, a cam 406 is provided which lies just beyond the outer surface of the face plate 240. As noted above, pins 318 extend through arcuate slots 320 in the face plate far enough to be engaged by the cam 406. This engagement serves to return the gear 288 and also the rack 273 and pusher 270 to their normal retracted position (FIG. 4).

Figures 5, 6:
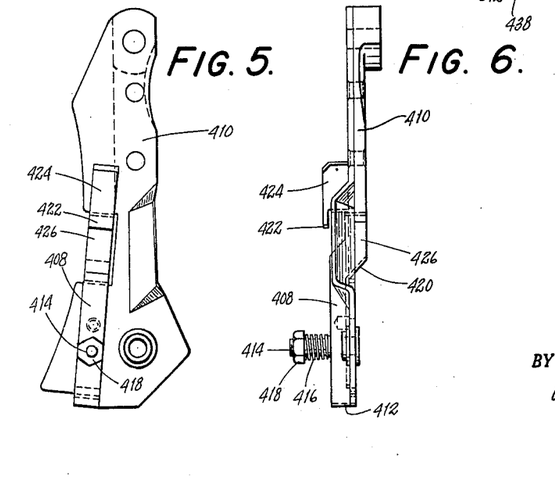
FIG. 5 is a side elevational view of the lateral stripper device removed from the machine.
FIG. 6 is an edge plan view of the device of FIG. 5.

Further movement of the plates causes the follower part 302 to be carried under a lateral stripper bar 408 (FIGS. 5 and 6). This bar is fulcrummed on a plate 410 at 412 and is slidable freely on a stud 414 on that plate. A spring 416 engaged between a nut 418 on the stud 414 and the bar 408 serves to press the bar always towards the plates. However, the follower part 302 engages a sloping surface 420 and pushes the bar outwards against the spring 416. Outward movement is limited by an overhanging lip 422 on a boss 424 on the plate 410. As soon as the follower part 302 is past, the bar 408 snaps back to its original position as shown in FIG. 6, and in this position it keeps the edges of the plates adjacent the follower part 302 clear of chips and the like, and also will knock down any nuts which happen to be carried around past the stripper. It will be noted that an end 426 (FIG. 4) lies adjacent this stripper. Actually, the end 426 may rest against the stripper member 386 until the extending part 302 of the gear passes it. The radial position of the end 426 is just beyond the edge of the face plate 240 but close enough thereto to prevent a nut from passing between the face plate and the end 426 of the bar 408.

As the wrench is carried around still further, it passes two clearing hooks. A first hook 426 (FIG. 4), is pivoted to the support 130 at 428 and is urged toward the plates by a spring 430. The spring 430 is fastened to the hook 426 and the support 130 by suitable end fastenings in any preferred manner well known in the art. A second hook 432 (FIGS. 3, 4 and 9) may be riveted to the support 130. The pivoted hook 426 is spring loaded merely as a precautionary measure, and it might also be riveted to the support with little or no likelihood of damage ever occurring to the machine according to observations. Thus, these hooks extend adjacent the wrenches 262 and serve to catch dirt, chips and the like as the plates rotate.

I have described only one wrench assembly. This assembly is duplicated around the plate eight times at equal spacing in the embodiment shown. More or fewer assemblies also could be used depending on the size of the machine and of the individual wrenches. However, in case more or fewer were used, the gear ratio between the ring gear and injector pinion would have to be changed and timed accordingly.

As the nuts are pushed out of the wrenches 262, they fall on a chain 434 (FIG. 4) engaged over sprockets 436 and drums 438 in any desired manner to deliver the nuts to an outlet chute 440. The chain may be driven by the lowermost sprocket 436 which, in turn, is driven through a suitable coupling extending from the power source at the left hand end of the machine.

Figure 2:
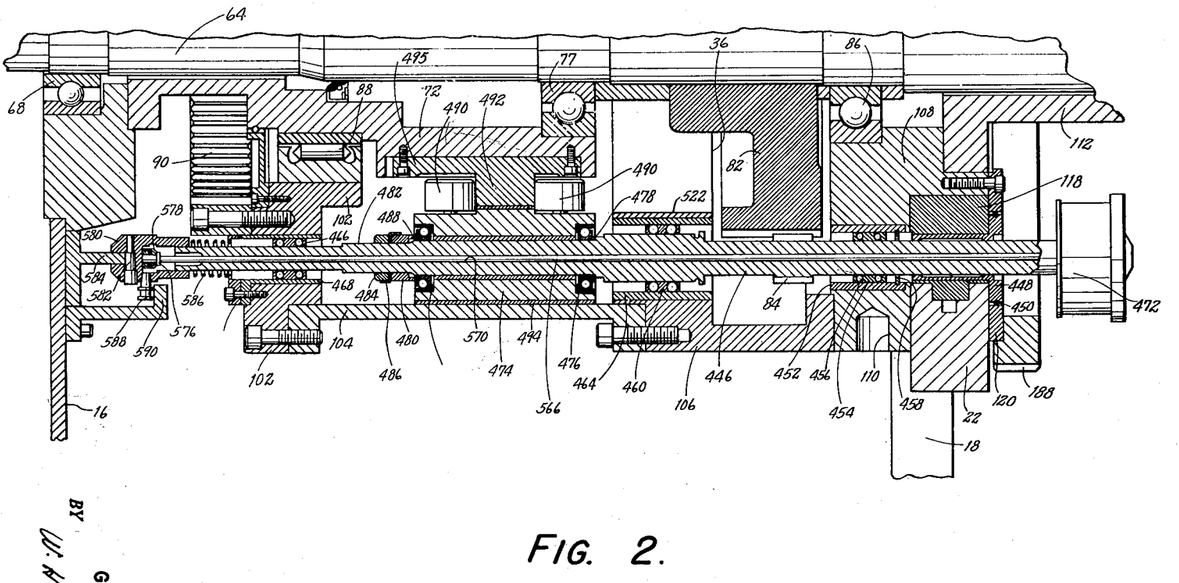
FIG. 2 is an enlarged sectional view of the spindle drive mechanism.

As noted above, the eight spindles on each side of the present embodiment are driven by the meshing engagement of the bull gears 82 with the pinions 84 on the spindles (FIGS. 1 and 2). Each of the spindles is adapted for longitudinal as well as rotary motion, thus being adapted to carry driving heads which drive a tool in a rotary motion while feeding it through a nut blank, and then following discharge of the finished nut, the heads carried by the spindles return the tool to its original position. It will be apparent that, while the shaft 64 is rotating in one direction, the spindle carrying drum device will be driven in the opposite direction because of the internal gear drive at the ends of the drum. Thus, the pinions 84 are carried around the bull gears 82 in a planetary manner and consequently are driven at a comparatively high speed. The pinions 84 may be formed as a part of the spindle 446 itself or may be suitably fixed thereto. It will be apparent that the direction of rotation of any or all of the spindles could be reversed by use of an idler gear between the pinion 84 and the bull gear 82. This might be useful in an operation where it was desired that the spindle on one side rotate in a direction opposite to that of the spindles on the other side. As best shown in FIG. 2, the spindle 446 extends through four of the individual members of the rotating drum. At its right hand end in that figure, the spindle is journalled in a bronze bearing bushing 448 pressed into the support member 118. Suitable packing 450 is provided between the cover 120 and the flange of the bushing to keep dirt and chips isolated from the bearings within the drum member, and to keep cutting fluid and the like within the bushing as will appear hereinafter.

The spindle 446 next passes through the end wall member 108. At this point, a hardened steel bushing 452 is pressed into the member. The surface of the spindle adjacent this bushing is also hardened. A form of ball bearing which will journal the shaft both for rotational and longitudinal motion is provided in the space between the bushing and the spindle. This bearing is formed by a sleeve 454 made of brass or similar material and into which two or more circumferential rows of balls 456 are stacked in holes formed therein. This assembly of balls and retainer is placed between the bushing 452 and the spindle shaft in that region which then act as races for the ball bearing. It is evident that, in addition to the rotary motion of a regular ball bearing, the spindle can move longitudinally, rolling the balls 456 on the bushing 452 and causing the retainer and ball assembly to move longitudinally one-half the distance moved by the spindle. The bearing is formed so that the balls are preloaded. That is, the diameter of the balls are slightly greater than the space allowed for them between the bushing 452 and the spindle 446. This preload is preferably of the order of .0003 to .0005 of an inch. A snap ring 458 may be provided for this bearing and may also be used for the others to hold standard oil seal rings in place if desired.

The second and third spindle bearings are similarly formed and preloaded. A second bearing 460 is located in an inwardly extending, wide flange 462 formed in the spindle support member 106. This bearing also includes a hardened bushing 464 pressed into an opening in the flange 462 as a race for the bearing. A third bearing 466 includes a bushing 468 pressed into the end plate 102 and on which the bearing may roll. A cover plate 470 may be provided at this end to protect the bearings and retain grease.

At its end nearest the center of the machine, each spindle carries a tool holding head 472 which will be described in more detail hereinafter. The pinion 84 is located between the first and second bearings 454 and 460, and a follower block 474 which controls the longitudinal movement of the spindle is located between the second and third bearings. The spindles are journalled in the follower blocks by two commerical angular contact ball bearings 476, one at each end of the block. A fixed position of the spindle relative to the block is maintained by engagement of one of the bearings with a shoulder 478 on the spindle against which the bearing is held by the pressure of a nut 480 against the other bearing. This nut is threaded on a threaded part 482 of the spindle shaft and is retained by a jam nut 484. A flanged washer 486 having portions bent over the flats of the nuts to prevent relative rotation therebetween is located between the nuts 480 and 484. The nut 480 may be partially bored out as shown (FIG. 2) to clear a shoulder 488 on the spindle.

The follower blocks 474 have a pair of rollers 490 spaced apart just far enough to straddle a cam ridge 492 formed on cam segment blocks 495 which are held in the stationary part 72 of the support for the machine. Thus, while the rollers straddle the cam ridge 492, of this drum cam, they will translate any change in the location of that ridge into longitudinal motion of the spindle. However, since the follower block is free to rotate on the spindle, it is necessary to have some means for holding it in a fixed position with the rollers engaging the ridge. This is accomplished by the engagement of the outer surface of a brass sheet 494 with the inner surface of the cover member 104 which are finished as a bearing surface for the follower blocks to slide on longitudinally. Because of their wide arcuate outer surface, the blocks are then restrained from turning about the spindles. Both the spindles 446 and the cover member 104 rotate about the center of the machine at the same speed. Therefore, the only motion between the cover 104 and the follower block is the longitudinal sliding induced by the cam.

Movement of the spindles 446 by the drum cam is effective to carry the heads 472 toward and away from each other and thereby to drive a tool 496 through the blank and to pass it from one head to another. This movement may be modified to break chips formed by the tool in cutting material from the blank which may be desirable with certain classes of material, particularly when larger sizes of nuts are being threaded so that the chips will be of greater length which may cause jamming of the mechanism. This result is accomplished simply by offsetting certain of the cam segments 494 from the true line which the head would normally follow. This can be readily accomplished by grinding the cam to the desired feed with the segments 492 in a given relative position and then physically moving some of the segments in a direction which would cause a slight backing off of the tool cutting edge from the surface being cut, the overall result being an oscillation of the tool as the threads are cut. This motion is particularly desirable during the initial or roughing cuts, and the segments may be selectively offset to provide a chip-breaking action primarily during that period of motion of the tool. The amount of the offset may be of the order of the depth of cut being taken by the tool or somewhat less. Thus, at the offset segments, if desired, the cutting edge may be almost completely backed off, thus breaking the chips. For most operations, this offset of the segments will be only a few thousandths of an inch and will readily be accommodated by the mounting of the segments. The reason such small offsets are effective to produce the desired result is formed in the roller type followers which fit snugly over the cam ridge 492 with substantially no clearance. This may be accomplished by preloading the followers. Therefore, any small variation in the cam is immediately transmitted from the follower through the spindle to the tool.

Precaution must be taken that the number of segments and the gear ratio of the spindle drive are not such that the tool is backed off each rotation at the same rotative position of the tool. It will be apparent that, if the tool is roated an even fraction of a turn while the follower is traversing one segment, and with similarly offset segments, the cut will be a wavy line. However, if the tool is rotated something other than an even fraction, the initial cut will be wavy, but following cutting edges will smooth out the waves, because they will be retracted at other points in the cut. Thus, the final result is uniformly smooth cut and is free from tearing because of jammed chips, and also without waves because of the proper proportions of the machine.

In some cases it might be desirable, however, to cut a wavy line such as in the case of a product whose finished threads are of a high finish, for example. In such cases it would be possible, with this type of cam construction, to offset certain sized cam segments to produce an action where the tool would cut first on one side of a thread and then the other to produce a wavy line. This wave could then be eliminated by a steady feeding final cut which would just shave off a very fine cut from the threads. This construction would require a longer tool with thread cutting edges ground for the particular cuts to be taken. The final cut being very thin could leave a fine finish on the threads as desired. Variations of these arrangements will readily occur to those skilled in the art.

Figure 14:
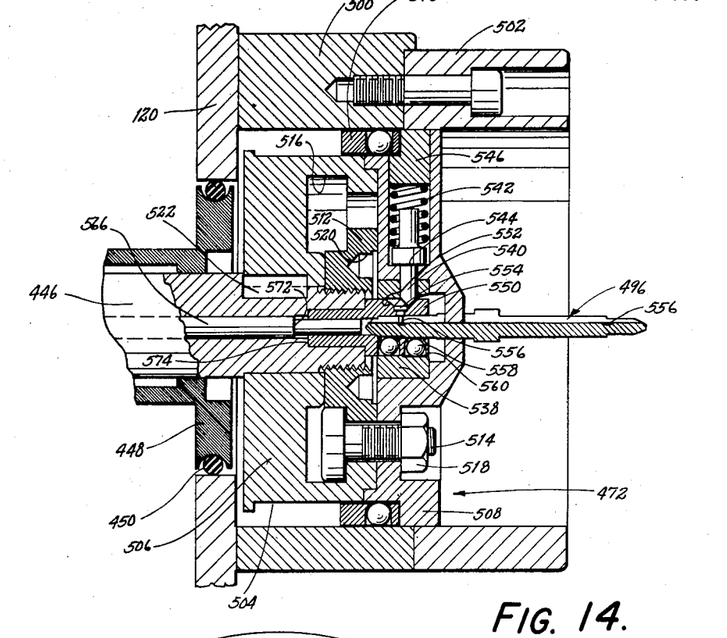
FIG. 14 is a sectional view of the vertical center line of a tool holding head.
Figure 15:
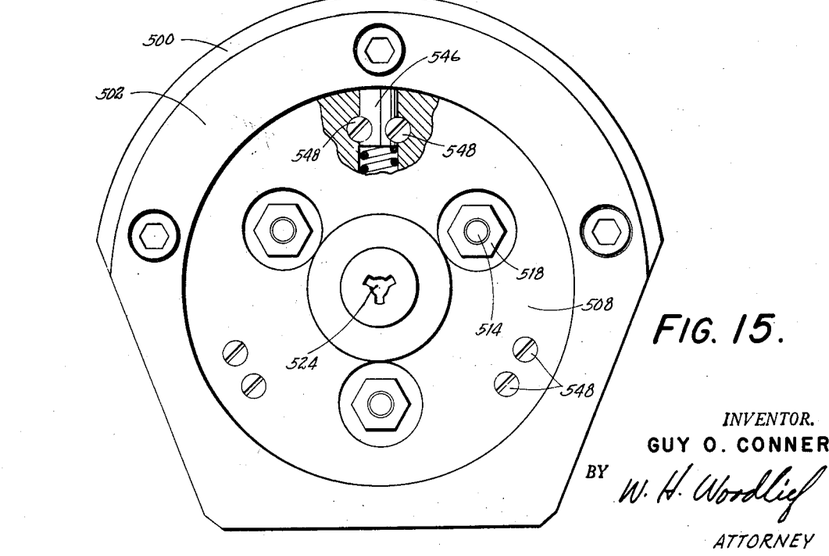
FIG. 15 is an end elevational view of the head mounted as in FIG. 14.

In FIGS. 14 and 15, the head is enclosed in a housing formed of two similar pieces 500 and 502 bolted together and fixed to the cover plate 120. These pieces are formed with an accurately machined and hardened inner cylindrical surface. The outer surface 504 of a base 506 of the head and of a portion of a front plate 508 are also hardened and ground. A bearing assembly 510 similar to those provided for the spindle in both formation and function is inserted in preload condition between the head and the housing to provide additional support for the head.

The head is formed of three principal pieces: the base 506, a retaining nut 512 and the front plate 508. These parts are held together by square headed bolts 514 engaged in an annular T-slot 516, formed by the base and retaining nut. The bolts 514 extend through spaced holes in the front plate and are fastened by nuts 518. The retaining nut 512 is screwed onto the end of the spindle and is formed with holes 520 to receive a spanner wrench. A key 522 engaged between the spindle and the base member 506 prevents relative rotation therebetween. The front plate 508 is formed with a central opening 524 shaped to fit the tool 496 which it is to carry (FIG. 15).

Figure 13:
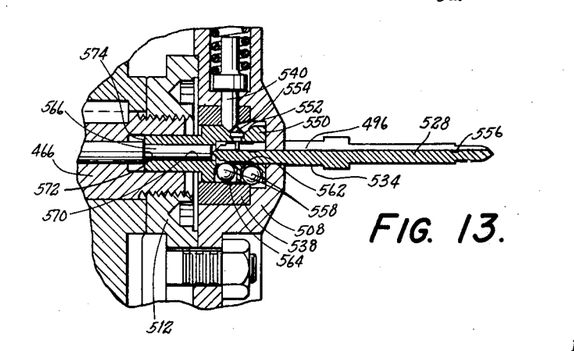
FIG. 13 is a fragmentary view similar to FIG. 14 showing the tool shank in a partly retracted position.

The tool 496 is formed with two shanks 526 and 528 on the ends of a thread cutting portion 530. This thread cutting portion may be formed as any thread cutting tap. The shanks also may be symmetrical but preferably are formed as shown in the drawings. The tool is initially supported by the right hand shank, while it is inserted through the nut, is then gripped by the other head on the left hand shank. Both shanks are held during the cutting operation, after which the tool is carried solely by the left hand shank and is withdrawn completely from the nut which is then discharged, after which the tool is passed back so that the right hand shank is picked up and held as initially; the left hand shank being released. At the ends 530, the shanks are pointed to assure easy entry into the head. The left hand shank 526 is formed in three different diameters; the first two being useful in holding and releasing the tool easily from the head as will appear later. The largest (534—FIG. 13) of the three diameters acts as a pilot diameter to center the nut blank as the tool is inserted into the hole in the center of the blank. This operation of the machine will also be described in greater detail hereinafter. Since there is no need for a pilot on the right hand shank 528 where the nut is discharged, this shank is formed with only the two diameters. In cross section the tool is formed with three equally spaced grooves 536 leaving three lands which are substantially complementary to the opening 524 (FIG. 15) in the front plate of the head. It will be obvious that the more grooves and lands could be used, but three is the preferred number, since, then, the tool is sure to be driven at all three points.

The head is formed with novel holding means for the tool which provides for easy insertion and ejection of the tool while, at the same time, assuring positive driving and removing any play from the grip. The driving is accomplished primarily by the engagement of the shank 526 or 528 with the opening 524 in the head. The other characteristics are obtained from a loaded bearing arrangement formed in the head by the following described means. A hardened bushing 538 is pressed into the front plate 508 at its center. At three equally spaced radii, pins 540 extend through openings in this bushing and the front plate. Each of these pins is pressed toward the center by a spring 542 engaged between a shouldered seat 544 and a plug 546. The spring, seat and plug are disposed in three equally spaced radial holes in the front plate. As best shown in FIG. 15, the plug 546 is held in the head by two screws 548 extending into the front plate and engaging notches on both sides of the plug.

A retainer bushing 550, slidably disposed in an opening in the center of the bushing 538, is provided with three elongated dimples 552 equally spaced about its periphery. Centrally disposed in the dimple is provided a pin 554 having a near conical or chisel-pointed head to match the point of the pin 540. The pin 554 extends through and is slidably in a hole in the bushing 550. Thus the pointed pins 540 act as detent pins on the bushing in two positions, one on each side of the pin 554. In addition to acting as a detent, the pins 540 hold the bushing and prevent it from rotating out of line with the tool and also transmit some of the force of the spring 542 to the headed pin 554 urging it also in an inward direction against the shank 526 or 528 of the tool 496. A dimple 556 formed in the shank 526 at the proper location provides surfaces engaged by the pin 554 which acts as a detent and holds the tool in place in the head.

In each angular space between the pins 540, the bushing 550 is formed as a bearing retainer containing two balls 558. The diameter of these balls is greater than the thickness of the bushing, thus allowing them to roll. When the tool 496 is in its inserted position (FIG. 14), the balls are engaged in a loaded state between the lands of the shank of the tool, and the inner surface of an opening 560 in the bushing 550. Thus the tool is supported at two longitudinal points at each of three circumferential locations. This support is very secure being obtained by the deformation of a steel ball of approximately .0005 of an inch on the diameter, although this amount may be varied according to the size of the tool used. These balls could also press into the grooves or flutes. This is particularly true where three or two flutes are used. In such a case, the flutes could be stepped in a manner similar to the lands in the preferred embodiment.

It will be noted that both the surface of the opening 560 and the lands of the shanks 526 and 528 are stepped, and that these steps are equal so that the balls may be of the same diameter and be equally loaded. As the tool is ejected, the balls are rolled on the bushing 538 by the movement of the tool, thus causing the retainer 550 to move outwardly also. However, the tool does not have to roll out of engagement with both balls in the row. If that were required, movement of the tool and of the retainer 550 would be more than could easily be accommodated. Therefore, the stepped construction is used. After the tool has rolled a short distance, the balls 558 nearest the outer face of the head roll off a step 562 on the shank of the tool. At the same time, the other balls are rolling off a step 564 in the inner surface of the bushing 550. The magnitude of the steps is such that the tool is then released and is free to pass out of the head. At this point, the retainer bushing 550 has rolled to the position where the spring pressed pin 540 has passed over the head of the pin 554 and is thus in position to locate the bushing at its outer position. It will be recognized that by using different sized balls on the two (or more) longitudinal positions, only one of the pressure surfaces need to be stepped to accomplish the desired result.

The tool is pushed out of the head by a rod 566 extending through a central opening 568 in the spindle. The retainer bushing has a hole 570 extending through it to receive the rod which can therefore engage the end of the tool to push it. The rod 566 is formed with a shoulder 572 adapted to engage the rear face 574 of the retainer to assure that it is moved to its outer position in place to receive the tool when it is again picked up by the head.

Movement of the rod 566 is induced by a cam and follower arrangement at the opposite end of the spindle from the head (FIG. 2). At this end, a collar 576 is formed on the rod to engage a small ball thrust bearing 578 held in a follower member 580. The follower member is freely journalled on the end of the spindle 446, so that it is carried by the spindle, but leaves the spindle free to rotate while the follower may be sliding longitudinally of the spindle. A roller 582 journalled in the member 580 engages a cam track 584 which extends into a slotted opening in the member 580. A spring 586 engaging the member 580 and the cover 470 urges the member 580 against the cam track 584, but in order to assure positive following by the follower, a radially extending roller 588 may be used engaging the surface of a second cam track 590. The tracks 584 and 590 may preferably be separate for ease of assembly. The cam tracks 584 and 590 are provided with matched surfaces since they operate on the same follower.

*Operation*

In its operation, as explained heretofore, the machine in its preferred embodiment is driven with two motions. The shaft 64 carrying the bull gears 82 rotates in a direction such that the top of the gears are approaching the observer in all figures. The drum carrying the spindles and work holding device rotates in the opposite direction.

Let it be assumed that the nut blank has just been injected into the work holder mechanism 116. The clamp 328 is held open by the cam formed on the support 130 and the tool 496 is firmly held in the right hand head 472 which is substantially fully retracted by the cam on the segments 494. The right hand central rod 566 is also retracted as its follower 580 follows the right hand cam fully to the right. This position may be considered as being at 330 degrees in the operating cycle. It will be noted that the left hand head 472 is located just slightly to the left of its completely extended position.

As the spindle moves from the first station to the second station, the left hand head moves slightly to pick up the tool. At the same time, the right hand head moves quite rapidly to the left causing the tool to enter the hole in the nut blank. During this motion, the hole in the blank is centered on the pilot part 534 of the tool 496. This is made possible because the clamp 328 is held open for a sufficient length of time and because the wrench member 262 is allowed a sufficient degree of movement as hereinbefore described. As soon as the blank is centered, however, the clamp member 328 is released and clamps the nut blank securely against the face plate. The blank is, therefore, properly centered on the tool and is firmly held in position so that the center line of the threads will be perpendicular to that face of the blank which is against the face plate. This is the condition of the parts at approximately 15 degrees in the cycle. It will be noted that the cams 584 follow almost exactly the spindle cams 494 between these stations; the only visible deviation being at about 330 degrees where the left hand head moves forward without the rod 566 following. This, however, is wholly unimportant, for the tool is not held in this head, and the retainer bushing (FIG. 14) has already been positioned as will appear later.

The actual cutting takes place between the second and fourth portions of the cycle. In the second portion of the cycle, the left hand head has already engaged the shank of the tool and is driving it on the flutes, although in this embodiment the tool is so short that it has not been firmly seated in the head. The tool is made short so that it will not break as easily because of a long extension and so that it will be more rigid. It will be recognized, however, that with larger tools it would be feasible and might be desirable to seat the tool securely in both heads before starting the thread cutting operation. As the spindles progress, the right head is fed to the left, forcing the tool through the blank. This motion appears between about 30 degrees to just before 150 degrees of the cycle. This is actually the working time of the tool. The cams are designed to feed the tool at the proper pitch for the desired thread, and this is one principal reason for the desirability of easy interchange of cam segments particularly in view of the different pitch thread systems for a single diameter screw now commonly in use.

During the feeding, the left hand head is substantially dwelling at its most extended position. The tool is continuously fed into the head, reversing the rolling of the balls 558 (FIG. 14) previously described, and seating the tool firmly in the left hand head. If the rod 566 is not properly retracted to the left at the time, the tool will slide it back against the thrust bearing 578 (FIG. 2). Also, during this movement, the retainer bushing 550 is moved back to its position shown in FIG. 10 by the rolling action of the balls.

At the fourth sector of the cycle, which corresponds to a point near 180 degrees, the tool is pushed out of the right hand head by the rod 566 which, in turn, is actuated by the slight rise in the cam present between 150 and 180 degrees of the cycle. This rise in the cam is effective to force the tool from the grip of the right hand head and to seat it firmly in the left hand head. At the same time, the retainer bushing 550 in the right hand head is positioned by the shoulder 572 on the rod 566.

At this point, too, the left hand head begins to recede from the work holder plates 116 and to carry the tool back with it. As the spindles progress to the fifth segment of the cycle, the tool 496 is completely withdrawn from the now completed nut. The clamp also is engaged by the cam on the support 130 again and is opened, and the nut is discharged by the pusher bar 270 into the outlet chute as hereinbefore described.

The next three segments of the cycle are provided for the transfer of the tool from the left hand head to the right hand head. This is accomplished while the clamp is held open and there is nothing held therein. This motion is similar to the passing of the tool in the other direction except that there is no feeding cycle, and therefore the exchange can be made more quickly. The exchange, in fact, is accomplished while the spindles pass from about 210 to just past 270 degrees in the cycle. In this space, the right hand head is substantially at a dwell in its furthest extended position. The left hand head quickly approaches it until the tool is completely inserted into the right hand head. As that head begins to pull away at approximately 270 degrees, the left hand cam 584 continues to push its rod 566 outward until the spindle reaches about 285 degrees, thus dislodging the tool from the left hand head and setting the retainer bushing.

As the spindles pass beyond this point, the right hand head is fully retracted whereupon the next nut blank is injected and the cycle starts again.

From the foregoing description, it can be seen that the spindle cam 492 and the push rod cam 584 could be substantially parallel for all except a very small part of the travel of the spindles. Since this is true, it is obvious that the push rod 566 could be carried with spindles throughout most of their travel, and only short wedge-shaped cams used where necessary to push the tool out of the respective heads. If such cams were to be used, the follower could be merely the end of the push rod which could slide on the cam for a short distance, or the follower could be formed by a ball retained on the end of the rod.

During the movement of the spindles longitudinally, they are also rotated because of the meshing of the pinions 84 with the gear 82. Since the spindles on one side are driven in unison with those on the opposite side, they are always in position to pass and receive the tool, and both are effective to drive the tool during the threading operation. The preloaded bearings 454, 469 and 466 (and also the bearing 510 if the housings 500, 502 of FIGS. 14 and 15 is used) are capable of both rotary and longitudinal motion, thus insuring a complete lack of "play" or "whip" in the spindles. Thus the spindle is always true, and since the nut blank is true, and both tool and blank are securely held, the threads will be cut to much closer tolerances than with prior machines using the conventional type "hook tap."

It will be recognized that the number of spindles in a machine built according to my invention is not fixed, but that more or fewer could be used. If more spindles were used and the machine driven at the same rotational speed, the output would be proportionately greater. Thus, it is possible with a multi-spindle machine to produce as many as 2500 nuts per minute as compared with present day production with conventional machines of from 50–100 nuts per minute. Moreover, the tool is no more expensive and perhaps less expensive than present day hook taps and, if made of suitable material, will last several times as long measured by the number of nuts produced per tap. This is true because of the complete lack of undesired relative motion between the tap and the nut blank, and because the use of fine fast cutting materials is feasible only with such a small tool. Thus my invention makes possible not only a greater production, but the upkeep cost, so far as tools go, is considerably less.

While the novel features of the invention have been illustrated and described in connection with a specific embodiment of the invention, it is believed that this embodiment will enable others skilled in the art to apply the principles of the invention in forms departing from the exemplary embodiment herein, and such departures are contemplated by the claims.

What is claimed is:

1. In a nut threading machine, a rotary work holder, a wrench member carried by said work holder, said wrench member having a configuration at the periphery of said work holder adapted to receive a nut blank and being mounted in said work holder for limited radial movement, a nut blank injector adapted to feed a nut blank to said wrench member during rotation of said work holder, tool inserting and rotating means rotatable with said work holder adapted to insert and rotate a threading tool through a nut blank in said wrench member as said work holder rotates beyond said nut blank injector, a thread cutting tool having a pilot portion at its free end carried by said tool inserting and rotating means, a clamping member carried by said work holder adjacent said wrench member adapted to clamp said wrench member and a nut blank therein against movement, cam means in the plane of said clamping member adapted to render said clamping member inoperative to clamp said wrench member and a nut blank therein until the pilot portion of said threading tool has been inserted through a nut blank in said wrench member and such nut blank has been aligned by the pilot portion of the threading tool for a blank threading operation.

2. In a nut threading machine, a work holder, a plurality of wrench members carried by said work holder, said wrench members having a configuration at the periphery of said work holder adapted to receive a nut blank and each being mounted in said work holder for limited radial movement, a nut blank injector adapted to feed nut blanks to said wrench members, tool inserting and rotating means operatively associated with each of said wrench members adapted to insert and rotate a threading tool through nut blanks in said wrench members, a thread cutting tool having a pilot portion at its free end carried by each of said tool inserting and rotating means, holding means adjacent each wrench member adapted to hold said wrench members and nut blanks therein against movement, means in the plane of said holding means adapted to render said holding means inoperative to hold said wrench members and nut blanks therein until the pilot portion of said threading tools has been inserted through nut blanks in said wrench members and such nut blanks have been aligned by the pilot portion of the threading tools for a blank threading operation.

3. In a nut threading machine, a rotary work holder, a plurality of wrench members carried by said work holder, said wrench members having a configuration at the periphery of said work holder adapted to receive a nut blank and each being mounted in said work holder for limited radial movement, a nut blank injector adapted to feed nut blanks to said wrench members during rotation of said work holder, tool inserting and rotating means rotatable with each of said wrench members adapted to insert and rotate a threading tool through nut blanks in said wrench members as said work holder rotates beyond said nut blank injector, a thread cutting tool having a pilot portion at its free end carried by each of said tool inserting and rotating means, a clamping member adjacent each wrench member adapted to clamp said wrench members and nut blanks therein against movement, cam means in the plane of said clamping members adapted to render said clamping members inoperative to clamp said wrench members and nut blanks therein until the pilot portion of said threading tools has been inserted through nut blanks in said wrench members and such nut blanks have been aligned by the pilot portion of the threading tools for a blank threading operation.

4. In a nut threading machine, a rotary work holder, a plurality of wrench members carried by said work holder, said wrench members having a configuration at the periphery of said work holder adapted to receive a nut blank and each being mounted in said work holder for limited radial movement, a nut blank injector adapted to feed nut blanks to said wrench members during rotation of said work holder, tool inserting and rotating means rotatable with each of said wrench members adapted to insert and rotate a threading tool through nut blanks in said wrench members as said work holder rotates beyond said nut blank injector, a thread cutting tool having a pilot portion at its free end carried by each of said tool inserting and rotating means, a clamping member carried by said work holder adjacent each wrench member adapted to clamp said wrench members and nut blanks therein against movement, stationary cam means in the plane of said clamping members adapted to render said clamping members inoperative to clamp said wrench members and nut blanks therein until the pilot portion of said threading tools has been inserted through nut blanks in said wrench members and such nut blanks have been aligned by the pilot portion of the threading tools for a blank threading operation.

5. In a nut threading machine, a face plate, a spider, and an intermediate carrier plate constituting a rotary work holder, a plurality of wrench members disposed in sockets formed in said carrier plate, said wrench members having a configuration at the periphery of said work holder adapted to receive a nut blank and each being mounted in its socket of said carrier plate for limited radial movement, a nut blank injector adapted to feed nut blanks to said wrench members during rotation of said work holder, tool inserting and rotating means rotatable with each of said wrench members adapted to insert and rotate a threading tool through nut blanks in each of said wrench members as said work holder rotates beyond said nut blank injector, a thread cutting tool having a pilot portion at its free end carried by each of said tool inserting and rotating means, a clamping member disposed in openings formed in said spider plate adjacent each wrench member adapted to clamp said wrench members and nut blanks therein against movement, cam means in the plane of said clamping members adapted to render said clamping members inoperative to clamp said wrench members and nut blanks therein until the pilot portion of the threading tools has been inserted through nut blanks in said wrench members and such nut blanks have been aligned by the pilot portion of the threading tools for a blank threading operation.

6. In a nut threading machine, a face plate, a spider, and an intermediate carrier plate constituting a rotary work holder, a plurality of wrench members disposed in sockets formed in said carrier plate, said wrench members having a configuration at the periphery of said work holder adapted to receive a nut blank and each being mounted in its socket of said carrier plate for limited radial movement, a nut blank injector adapted to feed in blanks to said wrench members during rotation of said work holder, tool inserting and rotating means rotatable with each of said wrench members adapted to insert and rotate a threading tool through nut blanks in each of said wrench members as said work holder rotates beyond said nut blank injector, a thread cutting tool having a pilot portion at its free end carried by each of said tool inserting and rotating means, a clamping member disposed in openings formed in said spider plate adjacent each wrench member adapted to clamp said wrench members and nut blanks therein against movement, a fixed support adjacent said work holder, cam means carried by said fixed support in the plane of said clamping members adapted to render said clamping members inoperative to clamp said wrench members and nut blanks therein until the pilot portion of the threading tools has been inserted through nut blanks in said wrench members and such nut blanks have been aligned by the pilot portion of the threading tools for a blank threading operation.

7. In a metal working machine, rotary work holding means, said rotary work holding means comprising a pair of face plates and a carrier plate fixed between said face plates, a workpiece holder socket in said carrier plate, a workpiece holder mounted for limited movement in said socket, means for feeding a tubular workpiece to said workpiece holder, a tool having a pilot portion at its free end adapted to operate on the internal walls of said tubular workpiece, means for feeding said tool into a workpiece within said workpiece holder whereby said pilot portion of said tool contacts said workpiece and centers the same in respect to said tool by movement of said workpiece holder within said workpiece holder socket, and means carried by one of said face plates for thereafter clamping said workpiece holder against the other of said face plates.

References Cited in the file of this patent

UNITED STATES PATENTS

| | | |
|---|---|---|
| 938,996 | Evans | Nov. 2, 1909 |
| 1,662,313 | Henrikson | Mar. 13, 1928 |
| 1,918,290 | Schiltz | July 18, 1933 |
| 2,388,779 | Boehmler | Nov. 13, 1945 |
| 2,768,393 | Sayce | Oct. 30, 1956 |
| 2,816,301 | Hopkins | Dec. 17, 1957 |